US007530298B2

(12) United States Patent
Peterson

(10) Patent No.: US 7,530,298 B2
(45) Date of Patent: May 12, 2009

(54) SAWMILL

(76) Inventor: Karl Jacob Peterson, 6 Henry Street, Rotorua (NZ) 3201

(*) Notice: Subject to any disclaimer, the term of this patent is extended or adjusted under 35 U.S.C. 154(b) by 18 days.

(21) Appl. No.: 10/514,247

(22) PCT Filed: May 23, 2003

(86) PCT No.: PCT/NZ03/00101

§ 371 (c)(1),
(2), (4) Date: Nov. 23, 2004

(87) PCT Pub. No.: WO03/099531

PCT Pub. Date: Dec. 4, 2003

(65) Prior Publication Data

US 2005/0160896 A1 Jul. 28, 2005

(30) Foreign Application Priority Data

May 23, 2002 (NZ) ..................................... 519155

(51) Int. Cl.
*B23D 45/02* (2006.01)

(52) U.S. Cl. ........................................ 83/473; 144/378

(58) Field of Classification Search ................ 83/471.2, 83/485, 489, 394, 395, 471.3, 473; 74/102; 144/378
See application file for complete search history.

(56) References Cited

U.S. PATENT DOCUMENTS 2,383,693 A 8/1945 Starr ........................... 74/102
2,625,966 A * 1/1953 Copp .......................... 83/473
2,956,595 A * 10/1960 Warrick et al. ................ 144/39
4,202,231 A * 5/1980 Striebig ....................... 83/453
4,584,918 A * 4/1986 Stubbe et al. .............. 83/471.3
4,792,190 A * 12/1988 Bertrand .................... 299/41.1
5,036,738 A * 8/1991 May .......................... 83/102.1
5,046,391 A * 9/1991 Lewis et al. .................... 83/489
5,109,899 A * 5/1992 Henderickson ............. 144/378
5,568,756 A * 10/1996 Peterson .................... 83/471.2
5,819,626 A * 10/1998 Lucas .......................... 83/489
6,684,750 B2 * 2/2004 Yu ............................. 83/473

* cited by examiner

*Primary Examiner*—Kenneth E. Peterson
(74) *Attorney, Agent, or Firm*—Bio Intellectual Property Services (BIO IPS) LLC.; O. M. (Sam) Zaghmout

(57) ABSTRACT

A sawmill having a saw blade 11 which can move between a substantially horizontal cutting position and a substantially vertical cutting position, the sawmill having a control arm 14 which operates to move the blade between the substantially horizontal and vertical cutting positions, the control arm 14 being mounted for pivotal movement about an axis 15, there being mechanism 18 which acts against the control arm in a substantially linear manner, wherein movement of the mechanism causes the control 14 arm to pivot about the axis 15 and move the blade 11 between the cutting positions. The sawmill may have a deflector in the form of a flap mounted adjacent the blade to deflect a cut board from the log as the next board is being cut.

12 Claims, 11 Drawing Sheets

SAWMILL

CROSS-REFERENCE TO RELATED APPLICATION

This application claims priority to PCT/NZ03/00101, filed May 23, 2003, entitled A SAWMILL. The entire content of it is incorporated herein by a reference.

FEDERALLY SPONSORED RESEARCH

Not Applicable

SEQUENCE LISTING OR PROGRAM

Not Applicable

FIELD OF THE INVENTION

This invention relates to sawmills generally, but has particular application with portable sawmills.

BACKGROUND

It is known to use portable sawmills to mill logs at remote locations. Examples of prior art sawmills are shown in the patent specifications GB 2,212,101 (Peterson), WO 97/35697 (Peterson Portable), 248548/250983 (Peterson Portable), U.S. Pat. No. 5,046,391 (Lewis), and U.S. Pat. No. 5,819,626 (Lucas). These prior art sawmills each have various advantages and disadvantages. It is an object of the present invention to provide further options for sawmilling, or to at least provide the public with a useful choice.

SUMMARY OF THE INVENTION

According to one aspect of the invention there is provided a sawmill having a saw blade which can move between a substantially horizontal cutting position and a substantially vertical cutting position, the sawmill having a control arm which operates to move the blade between the substantially horizontal and vertical cutting positions, the control arm being mounted for pivotal movement about an axis, there being runner means which runs along a side part of the control arm to push the control arm to cause the control arm to pivot about the axis and move the blade between the cutting positions; the runner means being such that it is able to cause the control arm to move to one of the cutting positons at which time it bears against the control arm to lock the blade in that position.

Preferably the sawmill has means to provide force to move the runner means.

Preferably the runner means moves in a linear non-swinging manner as the control arm pivots.

Preferably the side part of the control arm provides an at least partially curved raceway against which the runner means runs when the blade is moved between the cutting positions.

Preferably the side part of the control arm provides a raceway against which the runner means runs when the blade is moved between the cutting positions, and wherein the runner means comprises a roller.

Preferably the side part of the control arm provides a raceway against which the runner means runs when the blade is moved between the cutting positions, and wherein the runner means comprises a roller bearing.

Preferably the side part of the control arm provides an at least partially curved raceway against which the runner means runs as the blade is moving between the cutting positions, the control arm having a second side part, the first and second mentioned side parts each having a flared portion and wherein the runner means can be moved to bear down against the flared portions in turn to lock the blade in one of the two cutting positions respectively.

Preferably the side part of the control arm provides an at least partially curved raceway against which the runner means runs as the blade is moving between the cutting positions, the control arm having a second side part, the first and second mentioned side parts each having a flared portion and wherein the runner means can be moved to bear down against the flared portions in turn to lock the blade in one of the two cutting positions respectively, and wherein the runner means comprises a pair of rollers each of which is able to bear down upon a respective different one of the flared portions.

According to a further aspect of the invention there is provided a sawmill having a saw blade which can move between a substantially horizontal cutting position and a substantially vertical cutting position, the sawmill having a control arm which operates to move the blade between the substantially horizontal and vertical cutting positions, the control arm having a pair of oppositely disposed side parts each with a flared part, the control arm mounted for pivotal movement about an axis, there being runner means comprising a roller which is able to run along one of the side parts of the control arm to push the control arm to cause the control arm to pivot about the axis and move the blade between the cutting positions and then bear down against one of the flared parts to lock the blade in one of the cutting positions, and wherein the roller means is able to subsequently bear down on the other flared part to lock the blade in the other cutting position.

Preferably the one of the side parts that the roller is able to run along provides an at least partially curved raceway for that roller.

Preferably the roller means comprises a pair of rollers arranged such that one roller can bear down on one of the flared parts and the other roller can subsequently bear down on the other flared part to lock the blade in the cutting positions respectively.

DESCRIPTION OF THE DRAWINGS

In order that the invention may be more readily understood, and so that further features thereof may be appreciated, some embodiments of the invention will now be described, by way of example, with reference to the accompanying drawings, in which.

DETAILED DESCRIPTION

Figure 1:
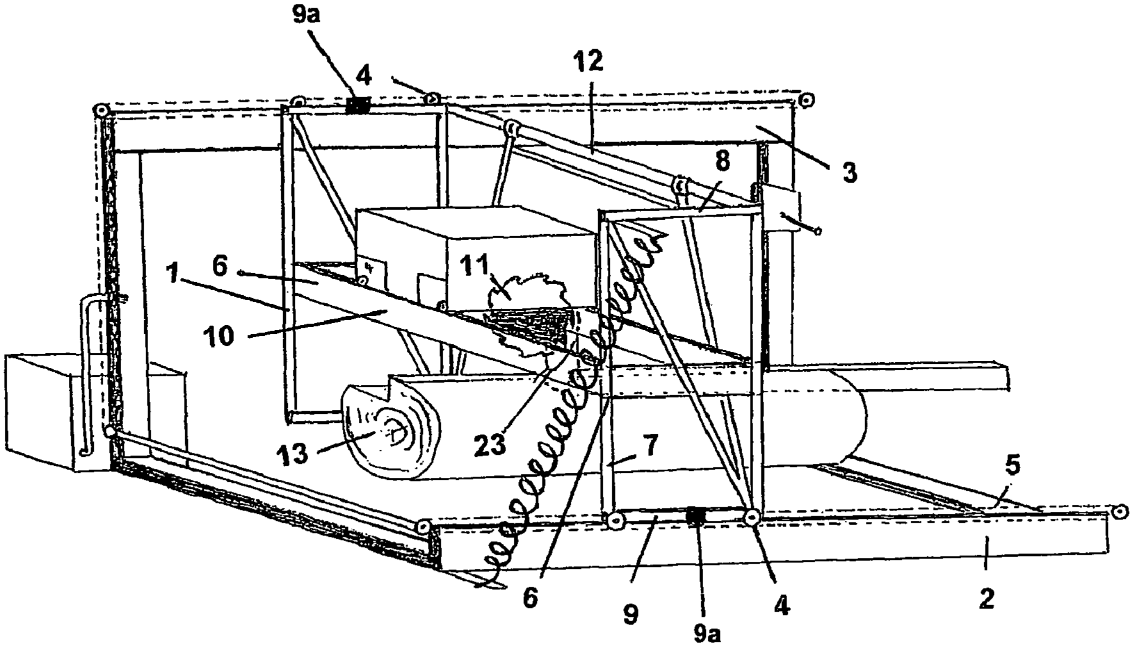
FIG. 1 illustrates a portable sawmill in accordance with one embodiment of the invention.

With reference to FIG. 1, a portable sawmill includes a carriage 1 arranged to be supported upon spaced apart tracks 2 and 3 to co-operate with wheels or rollers 4 mounted at the base or top of the carriage. The tracks 2 and 3 may be supported on skids 5.

The carriage 1 comprises two spaced apart rectangular end frames 6. Each end frame 6 comprises a pair of spaced apart tubular uprights 7 connected by an upper cross member 8 and a lower cross member 9. A substantially rectangular carriage deck 10, that extends, in use, between the end frames 6, is located for upward and downward movement relative to the uprights 7 by way of bushings (not shown). An example of suitable bushings is given in WO 97/35697.

The carriage deck 10 comprises means for mounting a saw with a circular blade 11, of which suitable means are described in the patent specifications GB-A-2212101, NZ 248548/250983, and WO 97/35697. One of the tracks 3 may be in a raised position co-operating with carriage wheels 4 mounted at the upper portion of one end frame 6. As sawdust is expelled to this side, this arrangement avoids interference caused by sawdust build-up around the low track. It also facilitates loading logs under the high track 3 into the mill, reducing the danger of damage to the tracks, during this operation. The carriage 1 comprises drive mechanisms allowing vertical movement of the carriage deck 10 and horizontal or sideways movement of the saw.

With further reference to FIG. 1, when the sawmill is in use it is arranged with a log 13 between the end frames 6 of the carriage and below the carriage deck 10. The carriage 1 is then run along the tracks 2 and 3 so that the saw blade 11 makes a vertical cut in the log 13. The saw blade 11 is then moved through 90 degrees to assume a horizontal orientation, and the carriage, and thus the blade 11, is moved back along the log to make a horizontal cut which intersects the first cut. In this way a board is cut from the log. The blade 11 is then set back to a vertical orientation, is moved sideways as desired, and the process is repeated continuously until the log is substantially milled into a number of boards. It will of-course be appreciated that the carriage deck 10 is moved downwards during milling after each complete row of boards is cut from the log. Preferably the carriage is clamped as at 9*a* (FIG. 1), or otherwise secured, to a chain drive or cable drive to facilitate movement of the carriage along the track.

Figure 2:
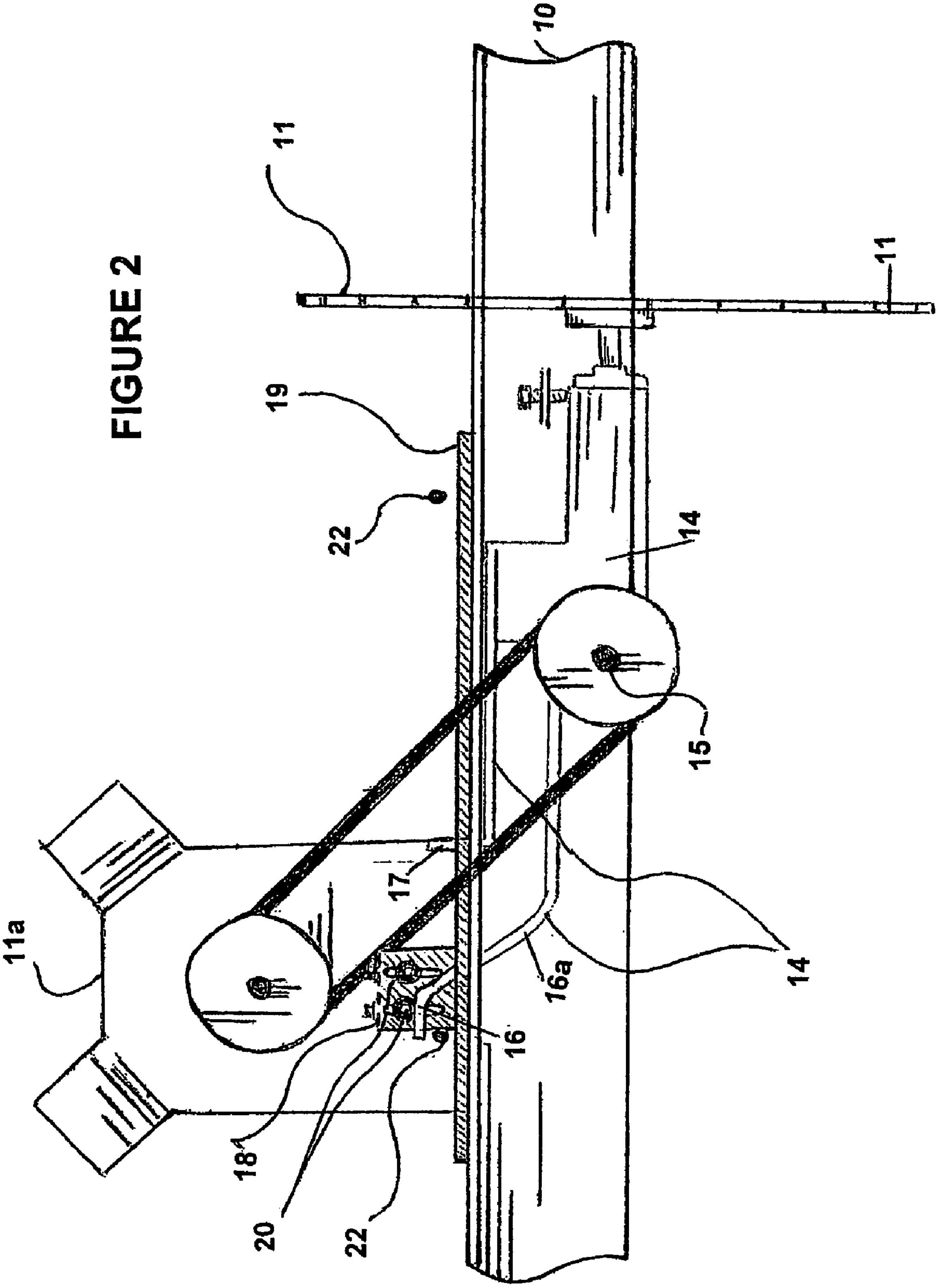
FIG. 2 illustrates a blade moving arrangement of the sawmill showing a saw blade in a vertical cutting position.
Figure 3:
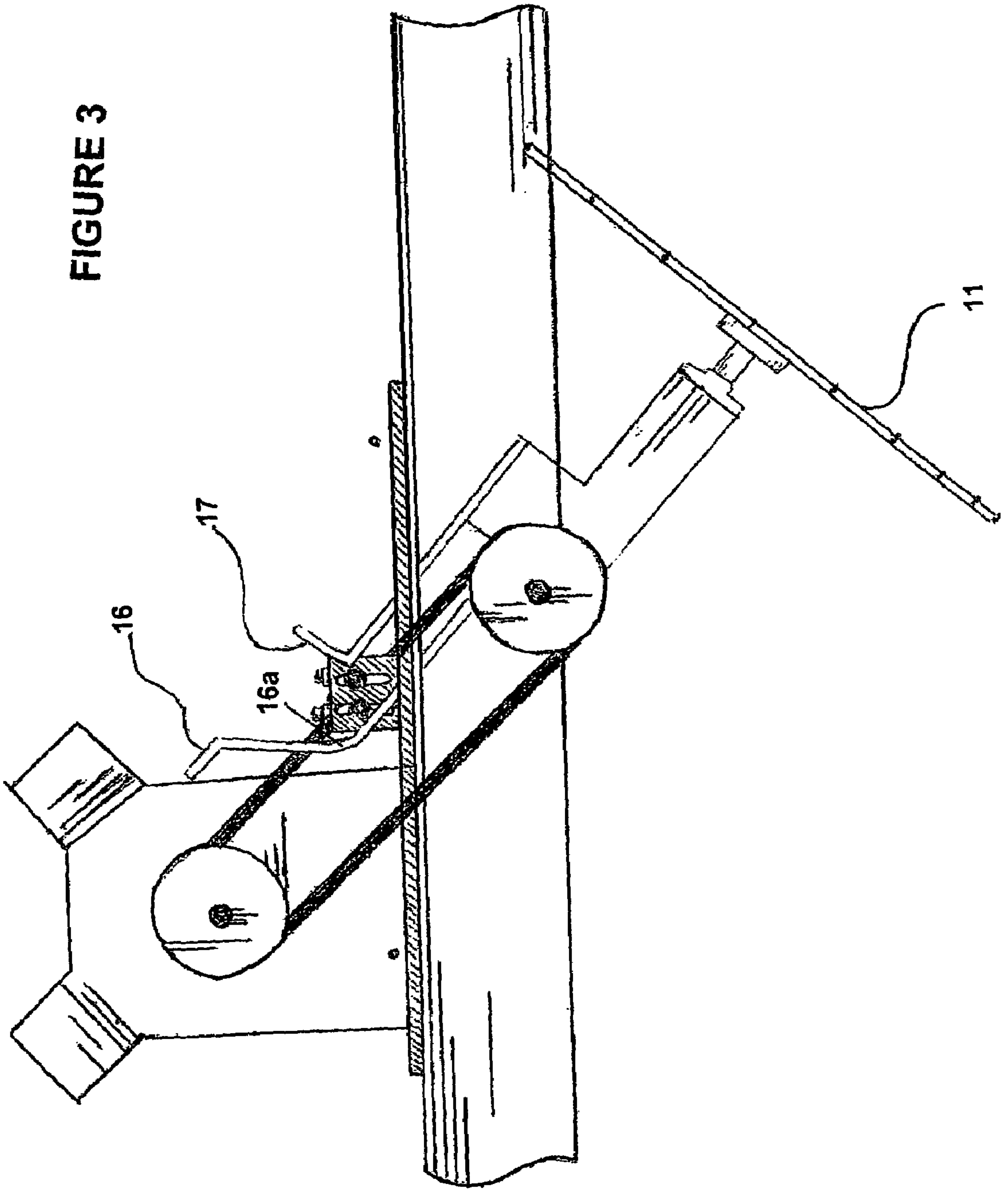
FIG. 3 illustrates the blade moving arrangement with the blade in transition between the vertical cutting position and a horizontal cutting position.
Figure 4:
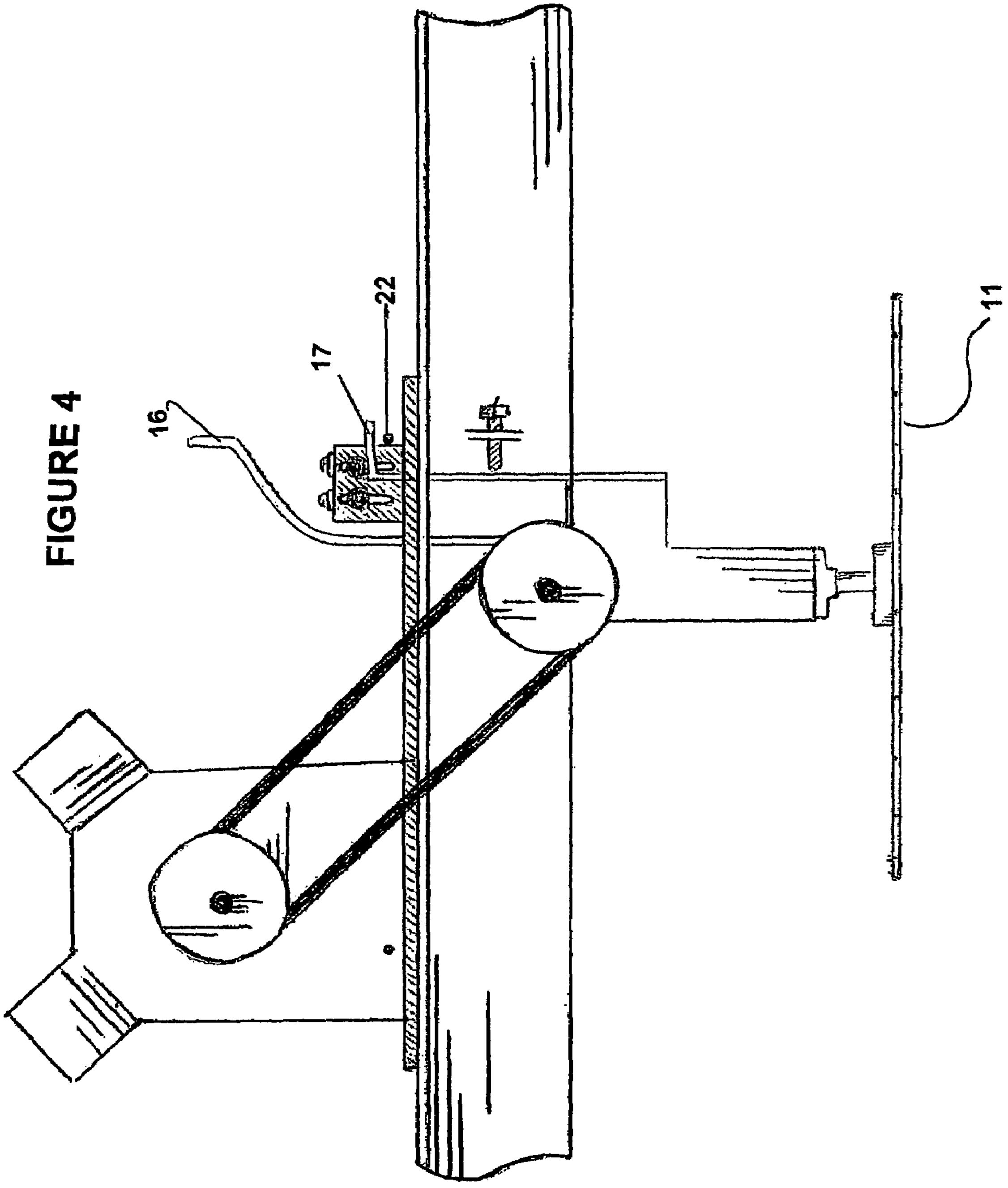
FIG. 4 illustrates the blade moving arrangement when the blade has arrived in the horizontal cutting position.

FIGS. 2, 3 and 4 show the means for moving the blade 11 between the vertical and horizontal orientations or cutting positions. Rotary power is provided to drive the blade 11 by way of a motor 11*a*. Referring to FIG. 2, the blade 11 is shown set in the vertical cutting position. The blade is mounted on a control arm 14, a medial part of which is in turn mounted for pivotal movement as at 15. The end of the control arm remote from the blade has flared side walls 16 and 17 opposite one another. As shown in FIG. 2, an operating means, comprising a block 18 slideable on a lineal rail 19 is immediately adjacent the left hand side flared wall 16. The block 18 has two roller bearings 20 set side by side, and fixed against movement other than when they move linearly with the rest of the block. The left hand roller bearing is positioned on top of and against the left hand side wall 16 when the blade 11 is in the vertical cutting position. This serves to lock the control arm 14, and thus the blade 11 in that position.

When it is desired to move the blade 11 to the horizontal cutting position the bock 18 is driven along the lineal rail 19 in a vertical motion to move the left hand bearing away from the left hand side wall 16. This unlocks the control arm 14 and allows it to pivot to swing the blade as shown in FIG. 3. The block 18 continues to move until the right hand bearing is positioned against and above the right hand side wall 17 as shown in FIG. 4. This serves to lock the control arm 14 with the blade 11 in the horizontal cutting position. Preferably when the blade is in the horizontal cutting position it can be used to make a horizontal cut from either side of the control arm.

Those skilled in the art will appreciate that movement of the block 18 in the reverse direction will return the blade 11 to the vertical cutting position. For the blade to reach the vertical cutting position the control arm 14 cannot simply be left to swing under gravity, but rather must be forced to move by the block 18, and more particularly by the left hand bearing. In this regard the left hand bearing contacts and runs along the left hand wall 16 to force the control arm around. To facilitate this the left hand side wall 16 has a curved section which provides a raceway 16*a* for the left hand bearing.

Figure 5:
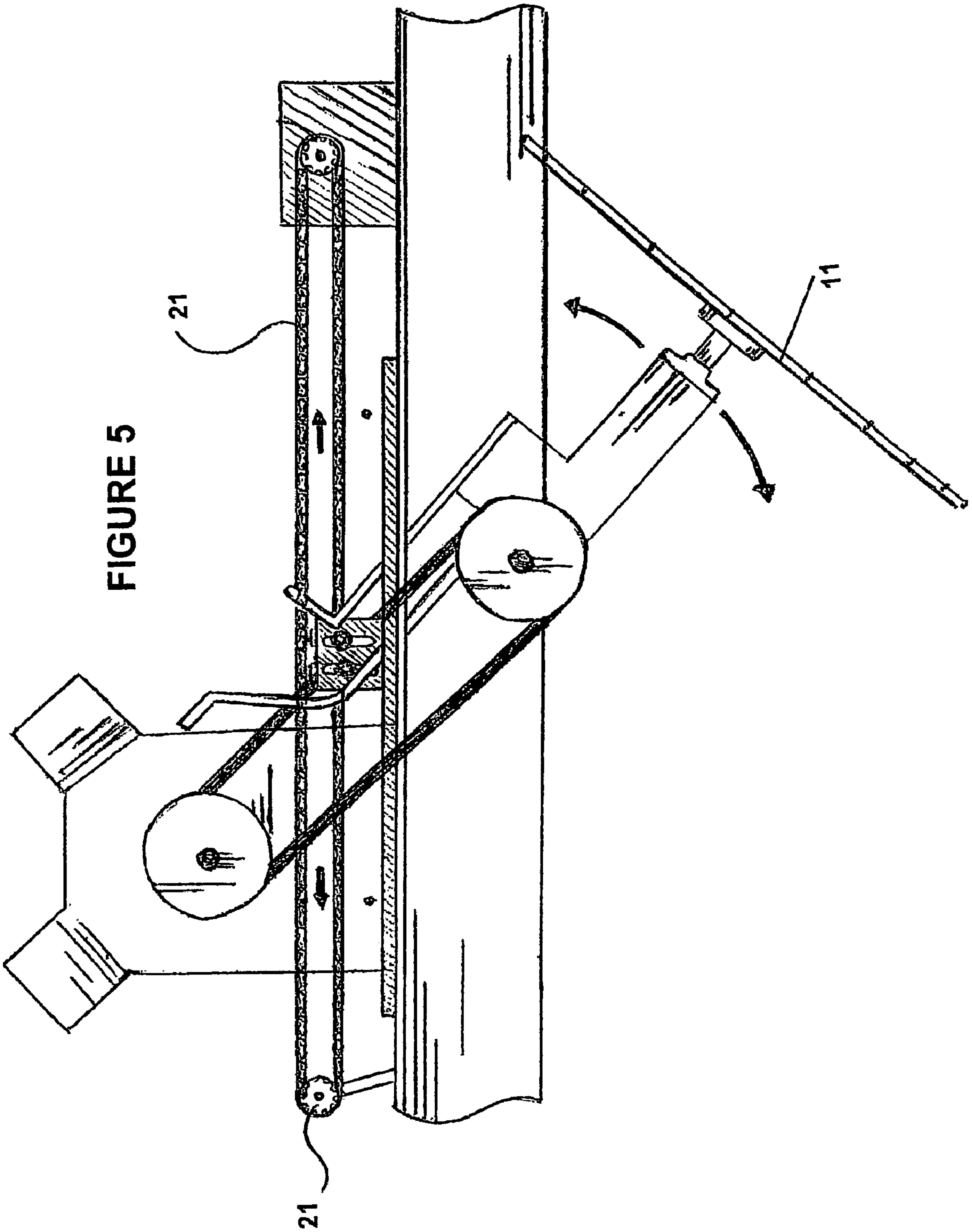
FIG. 5 illustrates a power mechanism for the blade moving arrangement.

FIG. 5 shows an embodiment of the invention which incorporates a chain drive arrangement 21 used to provide a driving force to move the block 18 along the lineal rail 19. It should however be appreciated that other drive arrangements can be utilized, and in some alternative embodiments the block may be moved manually.

Figure 6:
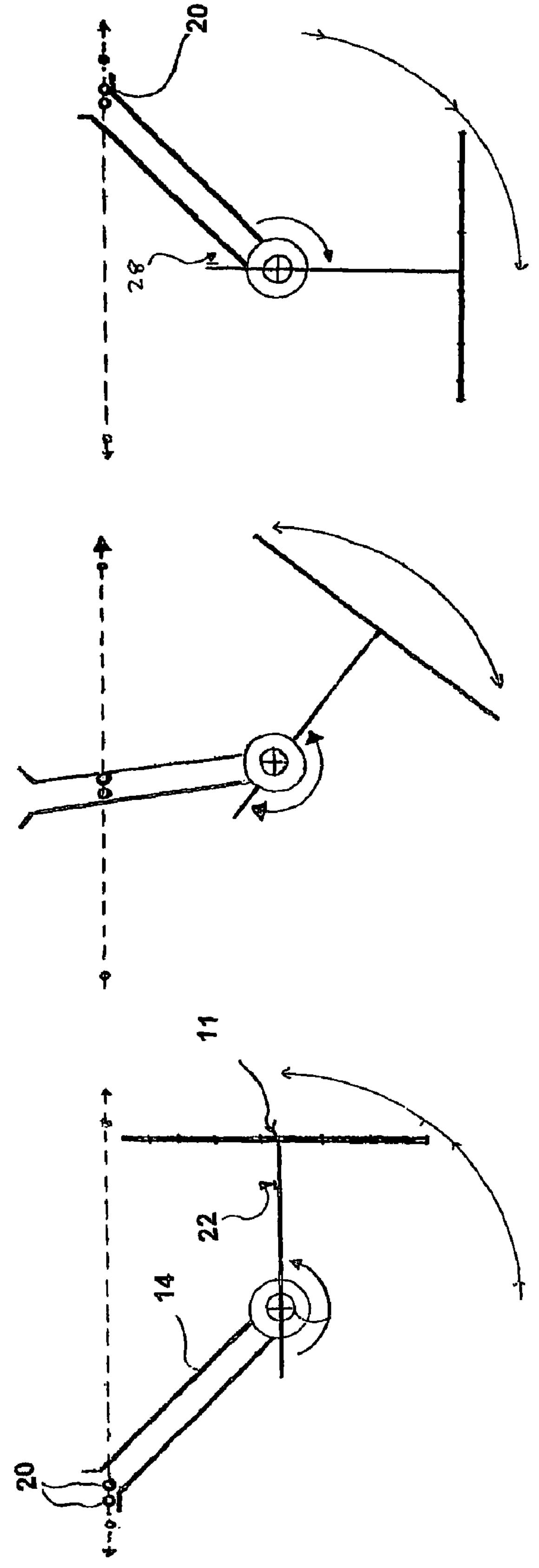
FIG. 6 illustrates, schematically, the manner of movement of the blade between the vertical and horizontal cutting positions.

FIG. 6 illustrates, schematically, the movement of the control arm 14 and thus the blade 11.

It will be appreciated by those skilled in the art that the sawmill described above provides a linear movement arrangement for moving the blade 11 between vertical and horizontal cutting positions, which is both easy to control and also offers a positive locking means. To appropriately limit the lineal movement of the block 18 and the bearings 20 the sawmill has suitable stoppers positioned at the points marked 22 in FIG. 2. The stoppers may be mechanical, electrical, or pneumatic, etc, in nature In one embodiment of the present invention there is provided means for removing a cut board from a log as the next board is being cut by a swing blade sawmill. This avoids down-time resulting from having to remove a cut board from the log by hand.

Figure 7:
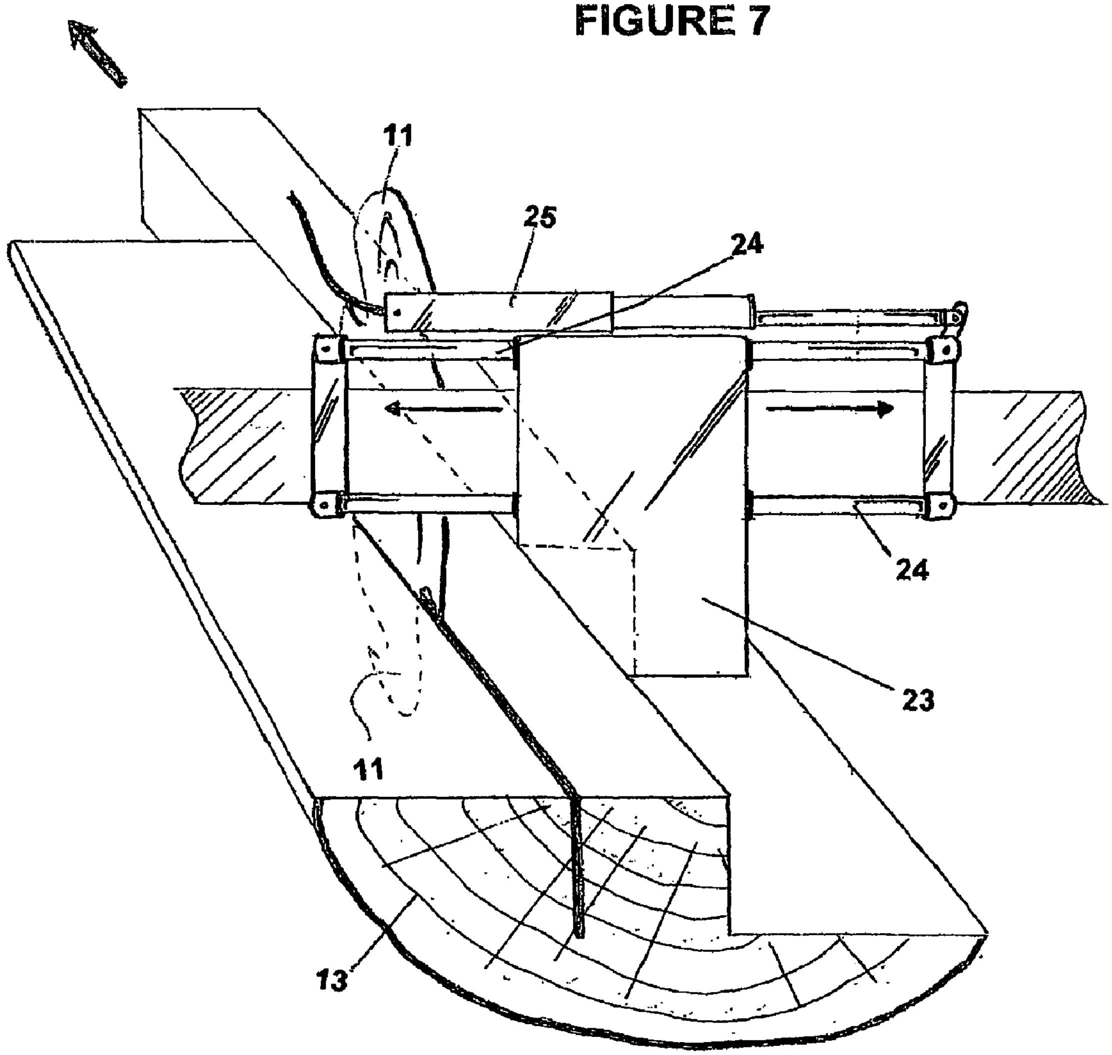
FIG. 7 illustrates a board removal system of the sawmill, FIG. 8 further illustrates the board removal system.

Referring to FIG. 7, board removal is achieved by way of a deflector in the form of a flap 23 mounted for sliding movement on rods 24 adjacent the front or rear of the saw blade 11. The flap 23 will be mounted adjacent the front or rear of the blade 11 depending on which end of the sawmill the operator wishes the cut boards to be deposited. The deflector can be used in connection with vertical or horizontal saw cuts. The arrangement is such that when a board has been cut in the log it remains in place until the next board is being cut. As that next board is being cut, with the carriage 1 moving along the log, the flap 23 contacts the board already cut and deflects/pushes it to an end of the sawmill. To facilitate this the carriage is preferably motor driven.

Figure 8:
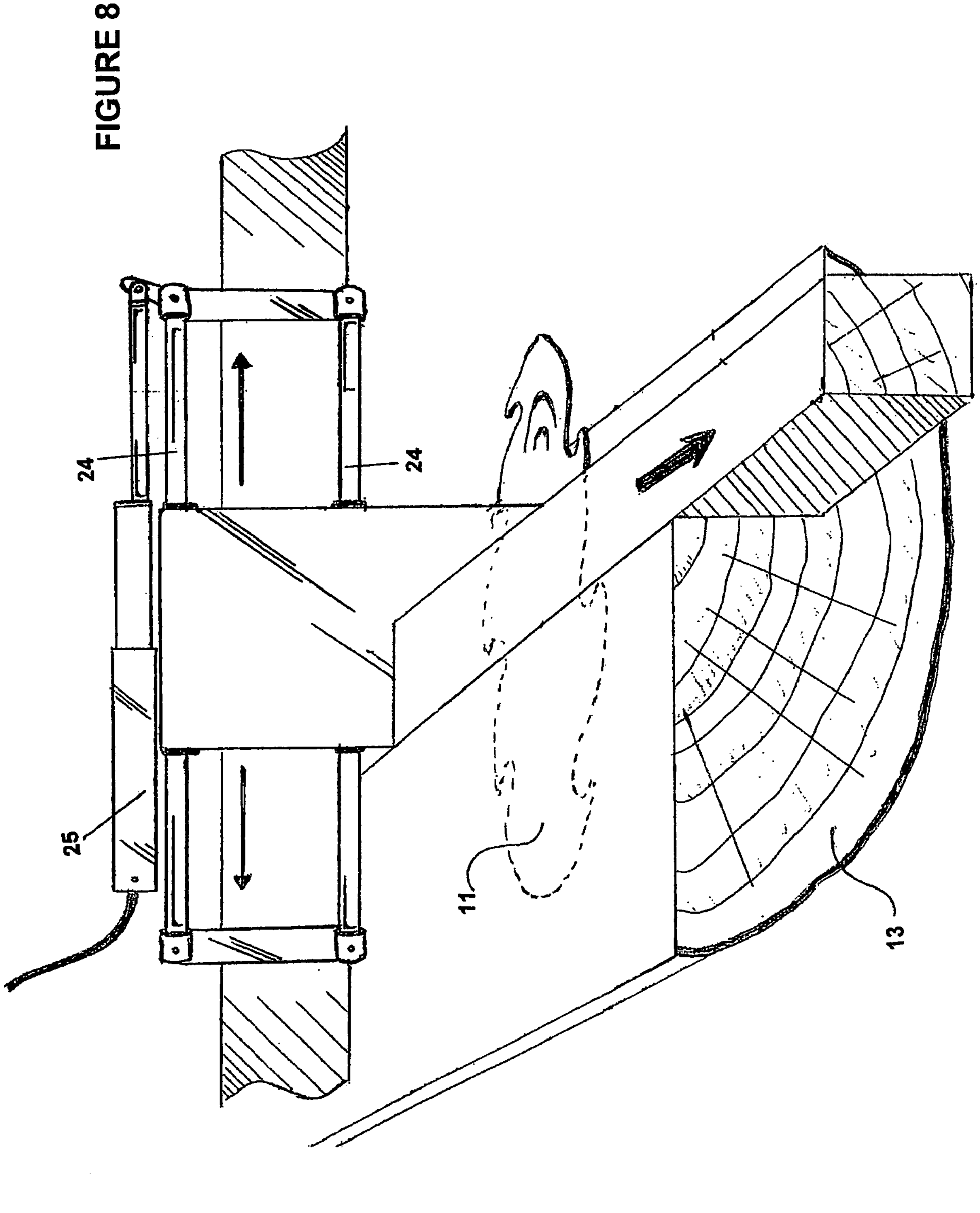

FIG. 7 shows the position of the flap 23 in relation to the blade 11 when the blade is in the substantially vertical cutting position. FIG. 8 shows the position of the flap 23 when the blade 11 is in the horizontal cutting position. The flap 23 is suspended alongside the blade 11 when the blade is in the substantially vertical cutting position. The flap 23 is suspended above the blade 11 when the blade is in the horizontal cutting position. As shown, the flap 23 does not overhang the whole width of the blade 11 when in the horizontal cutting position. The width of the blade that the flap 23 does not overhang is used to cut the next board in the log 13.

The flap 23 can be adjusted laterally in the left or right direction along the rods 24. This allows adjustment to position the flap 23 at the end of a board that has been cut, and allows adjustments for different sized boards. The operator will set the board remover flap 23 adjacent the edge of the board currently being cut. The part of the blade 11 that is not overhung by the flap 23 will be used to cut the next board.

In one embodiment of the invention the flap 23 is associated with the saw side-ways movement facility of the saw such that when the blade moves sideways the flap 23 moves side-ways by substantially the same distance, but in the opposite direction. This may allow space for a subsequent cut and allow the flap to work against the board just cut.

Preferably a rule or gauge is mounted on at least one of the rods 24 to aid with accurate positioning of the flap 23. Preferably the rods are associated with a power mechanism 25 to mechanically move the flap 23 along the rods, although this is not essential. In some embodiments of the invention the rods 24 may be threaded and driven by a DC motor for automatic setting, etc. Alternatively the flap 23 may be positioned manually and locked in place by a locking means such as a star knob or the like.

The flap 23 is preferably not free to hinge on any of the rods 24, but in some other embodiments of the invention it may be hinged so that it can be raised and lowered as required. The flap is preferably made of metal, although it could be made from other suitable durable materials.

As discussed above, the removal system is designed so that the flap pushes the cut board from the log as the blade makes the next cut in the log while the carriage travels. When the blade reaches the end of the log, the cut board is pushed clear from the log. The blade is then flipped to the vertical position to make a further cut in the board, in doing so the flap will be positioned so that it runs alongside the board being cut, and the carriage moves once again. Once the saw reaches the end of the log, the blade will be flipped to the horizontal position to cut the next board, simultaneously causing the flap to be positioned to remove the cut board when the carriage moves again.

Figure 9:
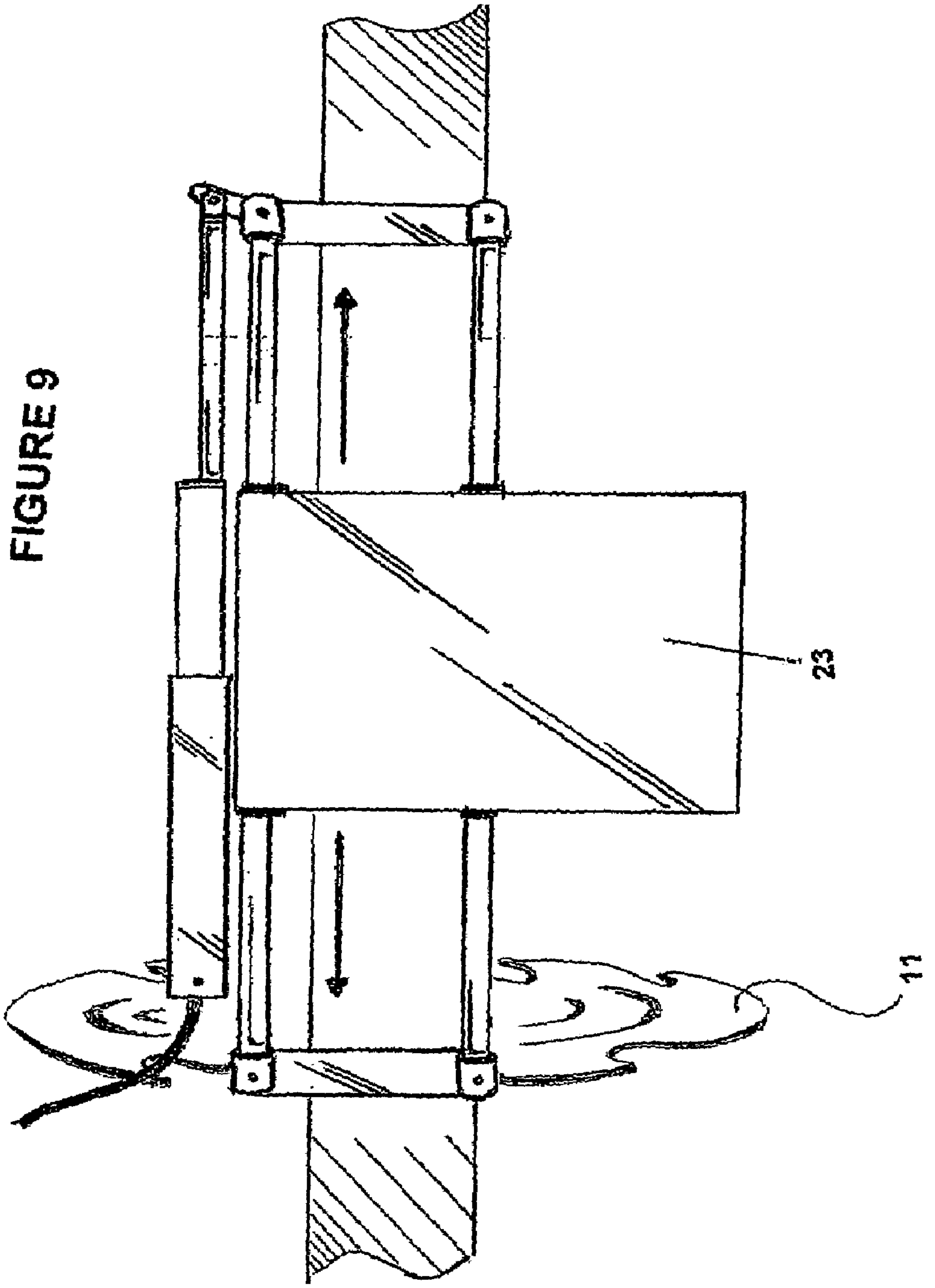
FIG. 9 illustrates the board removal system showing the blade in the vertical cutting position.
Figure 10:
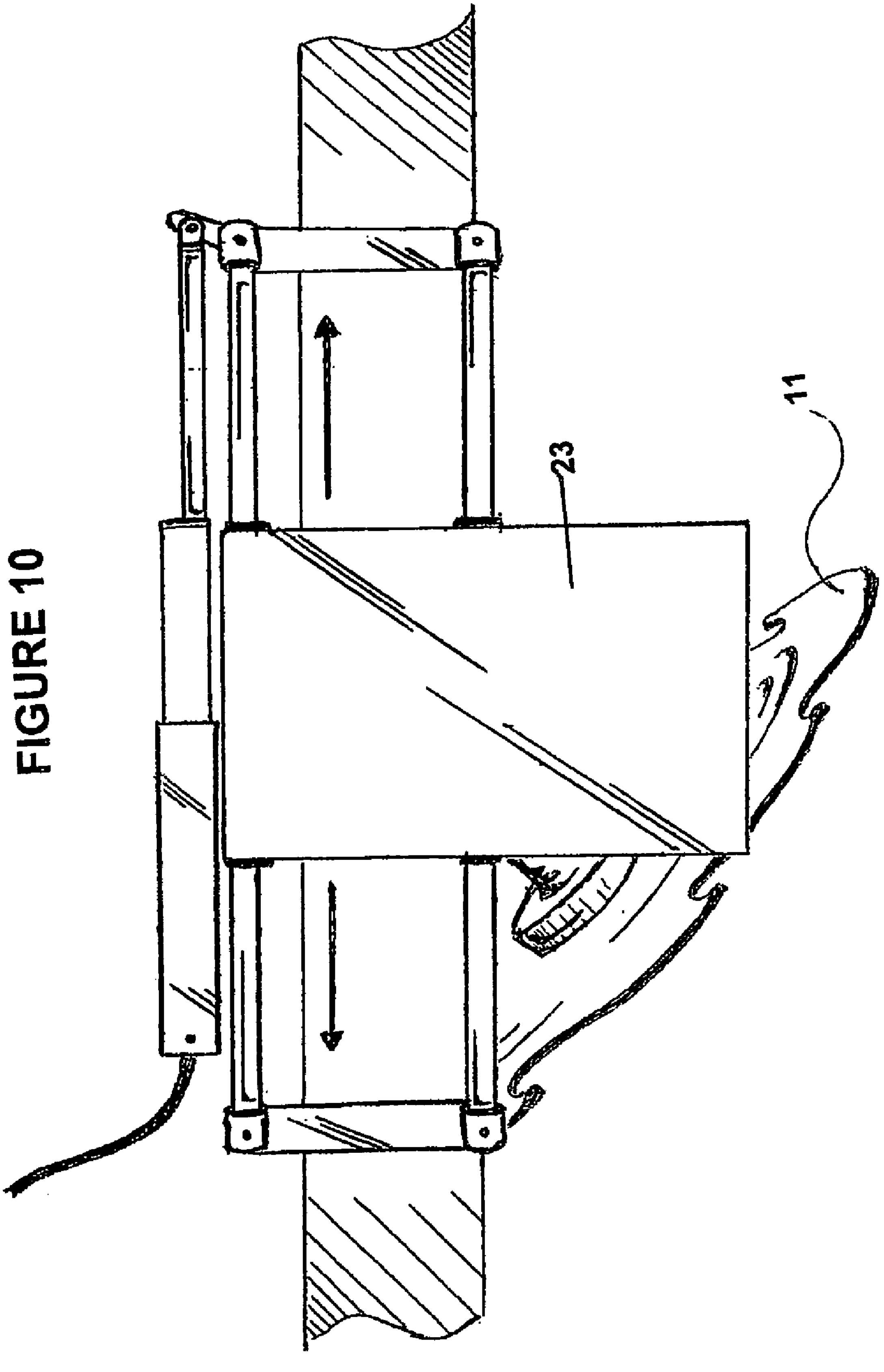
FIG. 10 illustrates the board removal system showing the blade in transition.
Figure 11:
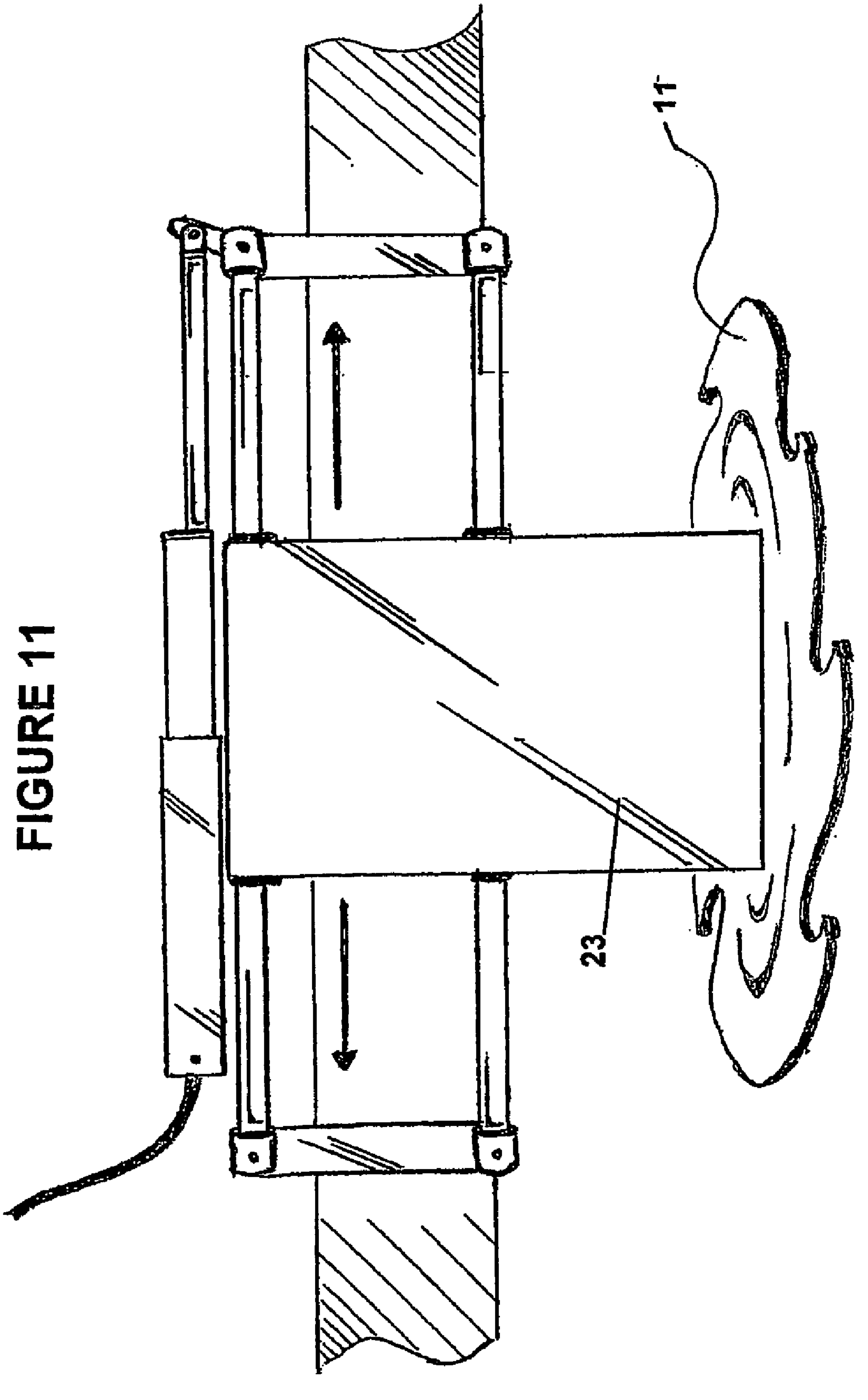
FIG. 11 illustrates the board removal system showing the blade in the horizontal cutting position.

FIGS. 9, 10 and 11 show the flap in various dispositions relative to the saw blade 11.

It will be appreciated that in some embodiments of the invention the flap 23 may be used as a guide as to the depth of a cut. In some embodiments the flap 23 may be capable of vertical adjustment to facilitate removal of a cut board above that being cut at the time.

In some embodiments of the invention the sawmill movement of the carriage 1, the sub carriage 10, the control arm 14, and the flap 23 may be achieved by one or more motors. The motor or motors may be controlled by a CPU so that direction, speed, or degree of movement of the above components can be set or regulated as desired. Preferably the sawmill is such that when the cutting speed of the blade changes significantly during cutting, the speed of the carriage 1 along the tracks 2 and 3 is automatically modified proportionately. For example, if the saw is laboring, and is thus moving more slowly while cutting a hard part of a log, then the speed of the carriage 1 along the tracks 2 and 3 is automatically reduced to allow the blade more time on that particular part of the log. When the blade speed subsequently increases the carriage automatically speeds up as it moves along the tracks.

While some preferred forms of the invention have been described herein, it should be appreciated that modifications and improvements can occur without departing from the scope of the following claims.

The invention claimed is:

1. A sawmill having a saw blade which can move between a substantially horizontal cutting position and a substantially vertical cutting position, the sawmill having a control arm which operates to move the blade between the substantially horizontal and vertical cutting positions, the control arm being mounted for pivotal movement about an axis, there being runner means which runs along a side part of the control arm to push the control arm to cause the control arm to pivot about the axis and move the blade between the cutting positions; the runner means being such that it is able to cause the control arm to move to one of the cutting positions at which time it bears against the control arm to lock the blade in that position; the sawmill formed such that the side part of the control arm provides a raceway against which the runner means runs as the blade is moving between the cutting positions, the control arm having a second side part, the first and second mentioned side parts each having a flared portion and wherein the runner means can be moved to bear down against the flared portions in turn to lock the blade in one of the two cutting positions respectively.

2. A sawmill according to claim 1, wherein the sawmill has means to provide force to move the runner means.

3. A sawmill according to claim 1, wherein the runner means moves in a linear non-swinging manner as the control arm pivots.

4. A sawmill according to claim 1, wherein the raceway is at least partially curved.

5. A sawmill according to claim 1, wherein the runner means comprises a roller.

6. A sawmill according to claim 1, wherein the runner means comprises a roller bearing.

7. A sawmill according to claim 1, wherein the runner means comprises a pair of rollers each of which is able to bear down upon a respective different one of the flared portions.

8. A sawmill according to claim 7, wherein the runner means moves in a linear non-swinging manner as the control arm pivots.

9. A sawmill having a saw blade which can move between a substantially horizontal cutting position and a substantially vertical cuffing position, the sawmill having a control arm which operates to move the blade between the substantially horizontal and vertical cutting positions, the control arm having a pair of oppositely disposed side parts each with a flared part, the control arm mounted for pivotal movement about an axis, there being runner means comprising a roller which is able to run along one of the side parts of the control arm to push the control arm to cause the control arm to pivot about the axis and move the blade between the cuffing positions and then bear down against one of the flared parts to lock the blade in one of the cutting positions, and wherein the roller means is able to subsequently bear down on the other flared part to lock the blade in the other cutting position.

10. A sawmill according to claim 9, wherein the one of the side parts that the roller is able to run along provides an at least partially curved raceway for that roller.

11. A sawmill according to claim 9, wherein the roller means comprises a pair of rollers arranged such that one roller can bear down on one of the flared parts and the other roller can subsequently bear down on the other flared part to lock the blade in the cutting positions respectively.

12. A sawmill according to claim 9, wherein the runner means moves in a linear non-swinging manner as the control arm pivots.

* * * * *